(12) United States Patent
Merrick et al.

(10) Patent No.: US 6,312,015 B1
(45) Date of Patent: Nov. 6, 2001

(54) CLAMP FOR RETRACTOR BELT

(75) Inventors: David D. Merrick, Cicero; Guy R. Dingman, Zionsville; Aaron J. Acton, Whitestown, all of IN (US)

(73) Assignee: Indiana Mills & Manufacturing, Inc., Westfield, IN (US)

(*) Notice: Subject to any disclaimer, the term of this patent is extended or adjusted under 35 U.S.C. 154(b) by 0 days.

(21) Appl. No.: 09/483,121

(22) Filed: Jan. 14, 2000

Related U.S. Application Data

(63) Continuation-in-part of application No. 08/964,974, filed on Nov. 5, 1997, now Pat. No. 6,065,777.

(51) Int. Cl.$^7$ .................................................. B60R 22/06
(52) U.S. Cl. ...................... 280/804; 280/801.1; 280/807; 280/808
(58) Field of Search ................. 280/804, 801.1, 280/807, 808; 297/464, 468, 473, 474, 476, 479, 481, 483, 485, 486

(56) References Cited

U.S. PATENT DOCUMENTS

| | | | |
|---|---|---|---|
| 4,726,625 | 2/1988 | Bougher | 297/483 |
| 4,832,410 | 5/1989 | Bougher | 297/474 |
| 4,919,484 | 4/1990 | Bougher et al. | 297/474 |
| 5,015,010 | 5/1991 | Homeier et al. | 280/808 |
| 5,054,815 | 10/1991 | Gavagan | 280/808 |
| 5,058,244 | 10/1991 | Fernandez | 24/170 |
| 5,125,686 | 6/1992 | Yano et al. | 280/808 |
| 5,138,749 | 8/1992 | McCune et al. | 24/196 |
| 5,149,136 | 9/1992 | Maekawa et al. | 280/808 |
| 5,154,446 | 10/1992 | Blake | 280/808 |
| 5,269,050 | 12/1993 | Yewer, Jr. | 24/170 |
| 5,286,057 | 2/1994 | Forster | 280/808 |
| 5,292,181 | 3/1994 | Dybro | 297/468 |
| 5,350,195 | 9/1994 | Brown | 280/806 |
| 5,350,196 | 9/1994 | Atkins | 280/808 |
| 5,443,302 | 8/1995 | Dybro | 297/471 |
| 5,495,646 | 3/1996 | Scrutchfield et al. | 24/500 |
| 5,609,367 | * 3/1997 | Eusebi et al. | 280/808 |
| 5,653,003 | 8/1997 | Freeman | 24/543 |
| 5,661,877 | 9/1997 | Bloomer | 24/170 |
| 5,669,253 | 9/1997 | Higgins | 70/18 |

\* cited by examiner

*Primary Examiner*—Eric Culbreth
(74) *Attorney, Agent, or Firm*—Woodard, Emhardt, Naughton, Moriarty & McNett

(57) ABSTRACT

A clamp for relieving the tension in a seatbelt. The clamp is moveable along a track between first and second endstops. The clamp includes a movable button which can be pushed by the passenger to lock the clamp to the seatbelt. The clamp can be secured to the seatbelt at the first endstop. Subsequent movement by the passenger results in the clamp moving along the track. Upon reseating by the passenger, the clamp will be supported at a support position intermediate of the first and second endstops, resulting in increased slack in the shoulder portion of the seatbelt, reduced tension in the shoulder portion, and increased comfort for the passenger.

31 Claims, 12 Drawing Sheets

CLAMP FOR RETRACTOR BELT

CROSS REFERENCE TO RELATED APPLICATIONS

This application is a continuation-in-part of U.S. patent application Ser. No. 08/964,974, filed Nov. 5, 1997 now U.S. Pat. No. 6,065,777.

BACKGROUND OF THE INVENTION

This invention relates generally to passenger restraint systems which include seatbelts, and more particularly to a system which includes a seatbelt retractor.

Seatbelt systems, such as those typically employed in passenger vehicles, include a retractor for collecting excess belting and providing tensioning for the system. With certain types of retractors, a degree of tension in the belt is imposed by the retractor. This tension will provide a tugging against the shoulder of the passenger which can be uncomfortable. There are various designs which have been proposed to reduce this tugging and chafing of the shoulder belt against the shoulder of the passenger. Some of these designs permit the passenger to select the amount of excess slack in the seatbelt.

Nevertheless, there is always a need for an alternate passenger restraint system to overcome the situation in which tension from a retractor is felt against the shoulder of the passenger. The present invention provides a novel and unobvious way to reduce tension in the shoulder portions.

SUMMARY OF THE INVENTION

The present invention provides for improved apparatus and methods for a passenger restraint system for a vehicle. One aspect of the present invention includes a passenger restraint system with a passenger seat, a seatbelt for securing a passenger within the seat, and a retractor for retracting the seatbelt, the retractor being capable of holding the seatbelt during deceleration of the vehicle. The system further includes a track and a clamp moveable on the track. The clamp is capable of releaseably clamping the seatbelt, and the clamp includes a moveable button.

These and other objects and advantages of the present invention will be apparent from the drawings, description of the preferred embodiment, and the claims to follow.

DESCRIPTION OF THE PREFERRED EMBODIMENTS

Figure 1:
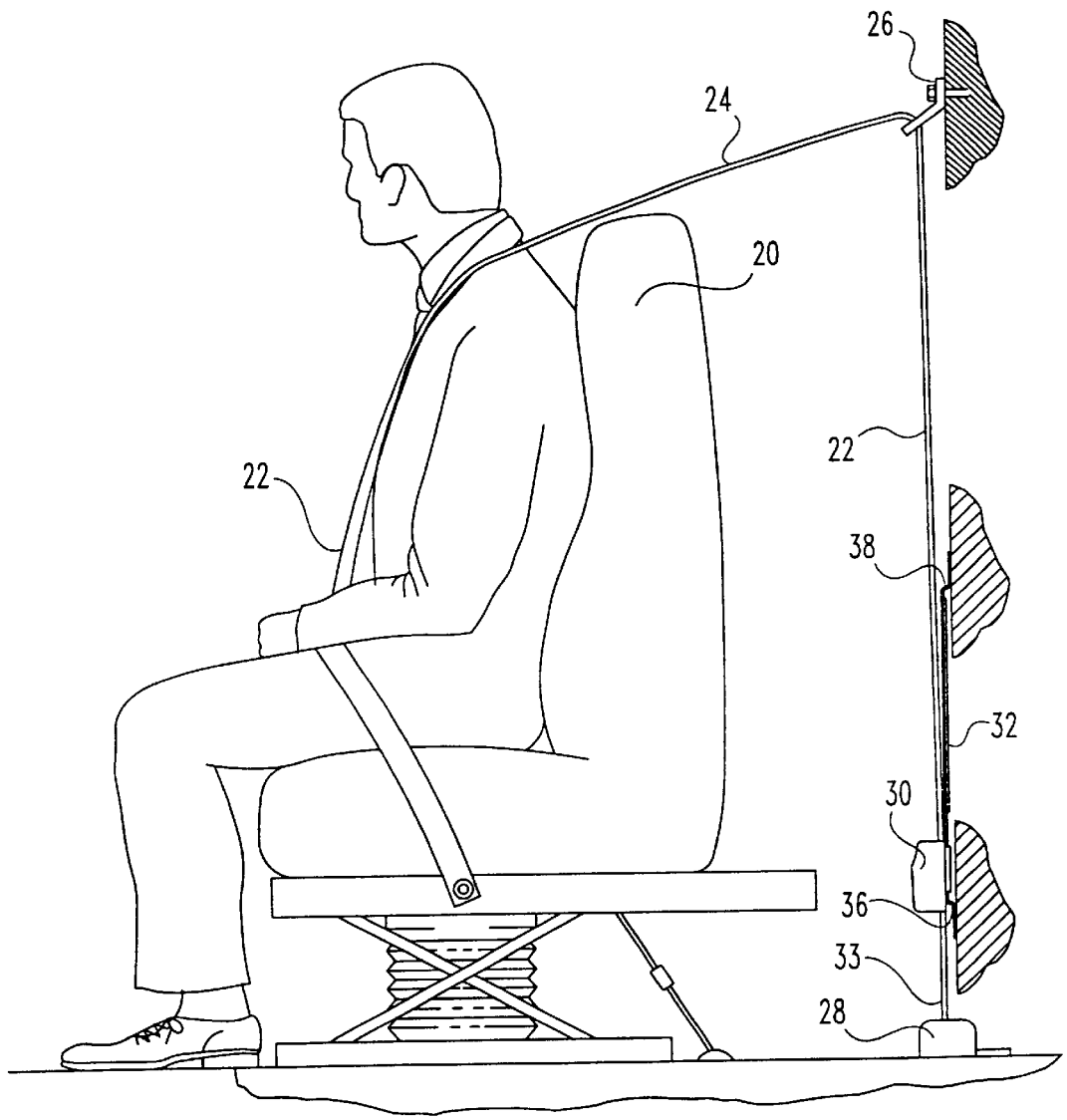
FIG. 1 shows an alternate embodiment of the present invention as used within a vehicle.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

FIG. 1 shows one embodiment of the present invention as used within a vehicle. A passenger is shown secured to a seat 20 by a three point seatbelt 22. Seatbelt 22 includes a shoulder portion 24 that rides over the shoulder of the passenger and passes through a support 26 which is anchored to the structure of the vehicle. Support 26 permits shoulder portion 24 to pass freely through. On example of support 26 is a D-loop, although there are other types of supports known to those of ordinary skill in the art.

Seatbelt 22 may be pulled from a retractor 28 which is anchored to the structure of the vehicle. One end of seatbelt 22 is attached to a spring biased spool rotatably mounted within retractor 28 whereas the opposite end of seatbelt 22 is anchored to the frame of the seat. A conventional tongue is slidably mounted between the ends of the seatbelt and is releaseably lockable, in the conventional manner, with a buckle also anchored to the seatbelt frame when shoulder portion 24 is pulled across the chest of the occupant.

Retractor 28 provides a length of belt to the passenger when seatbelt 22 is buckled, or after buckling when the passenger moves. During a rapid deceleration of the vehicle, retractor 28 locks seatbelt 22 from further extension such that the passenger is held securely in seat 20. Retractor 28 may be of the inertia reel type, an electronically controlled type, or other types known to those of ordinary skill in the art. During non-emergency operation, retractor 28 places tension in belt 22 in the direction of retracting seatbelt 22 to within retractor 28.

Located between retractor 28 and support 26 is clamp assembly 30 which is movable along track 32. Track 32 is secured to a portion of the vehicle. Although support 26, retractor 28, clamp 30, and track 32 are shown behind seat 20, and in front of the rear vehicle compartment wall, they also may be located to a side of seat 20, or along the B-pillar of the vehicle. Likewise, retractor 28 may be concealed or behind the rear compartment wall with seatbelt 22 extending through a slot in the compartment rear wall to the clamp assembly 30 mounted in front of the wall. Likewise, clamp 30 may be mounted adjacent support 26.

Figure 2:
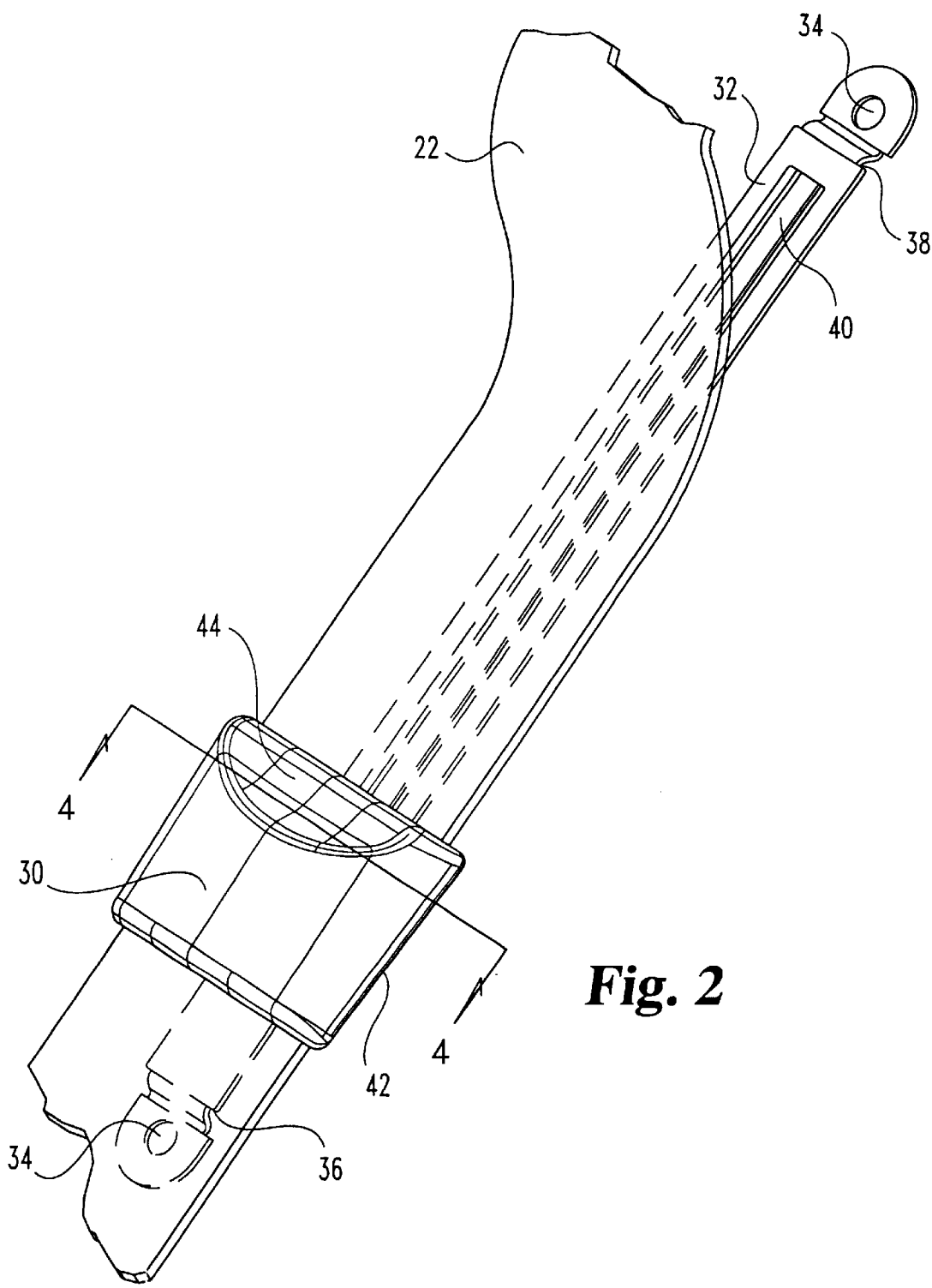
FIG. 2 is a perspective view of the clamp, track, and belt of FIG. 1.

FIG. 2 is a perspective view of the clamp, track, and belt of FIG. 1. Seatbelt 22 passes through clamp 30. Track 32 is retained to the vehicle by fasteners (not shown) that act through fastener holes 34. Clamp 30 is moveable along track 32 from a first endstop 36 to a second endstop 38. Endstops 36 and 38 are angled portions of track 32. Clamp 30 in FIG. 2 is shown placed at a support position 42.

Figure 3:
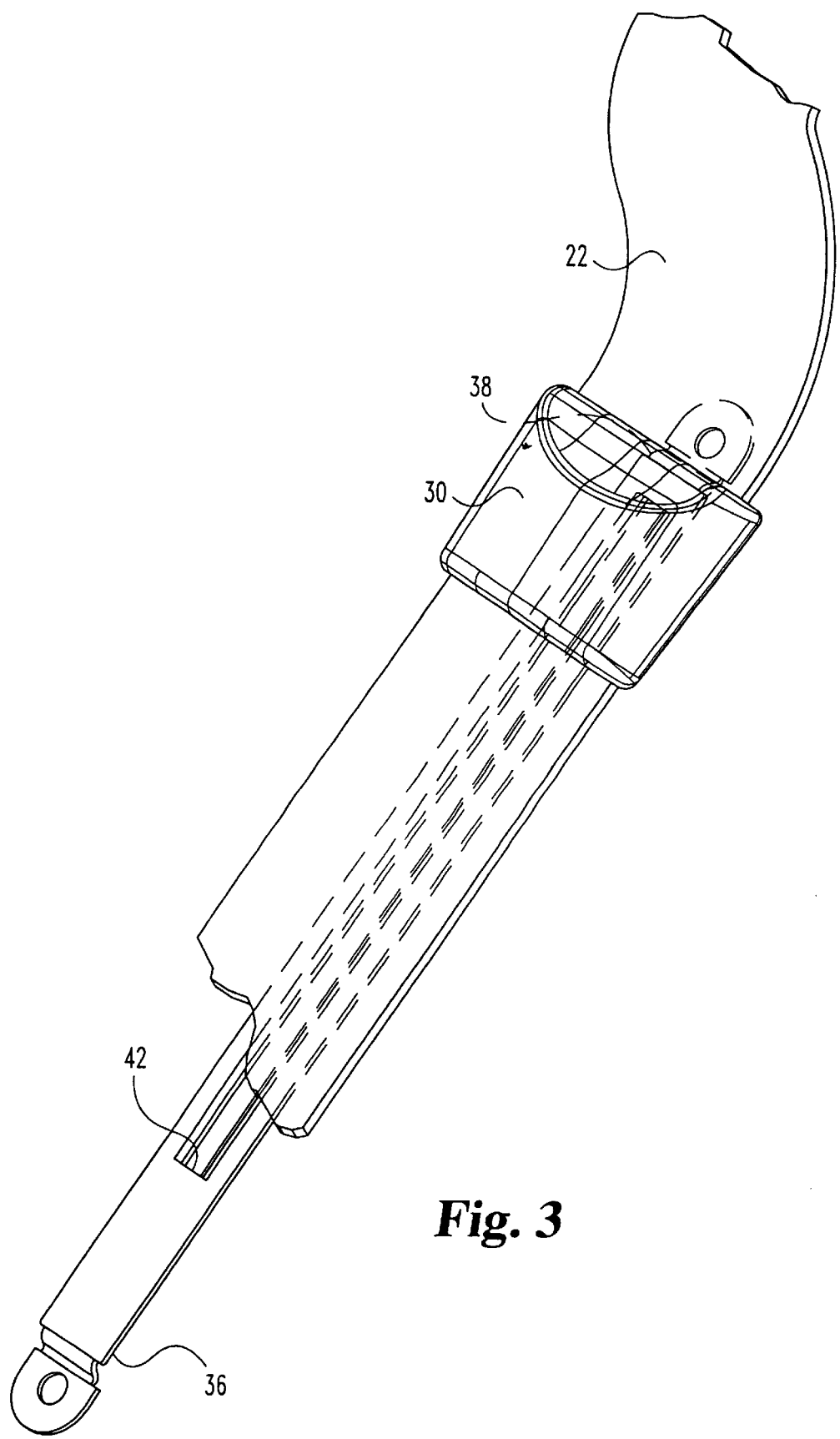
FIG. 3 is a perspective view of the clamp, track, and belt of FIG. 1 with the clamp moved to the second endstop.

FIG. 3 shows clamp 30 at second endstop 38. Track 32 includes a groove 40 (FIG. 2) that extends generally from second endstop 38 to a support position 42. Support position 42 is spaced apart from first endstop 36. Clamp 30 includes a rounded depression 44 to permit a person's hand to easily push clamp 30 toward first endstop 36.

Figure 4:
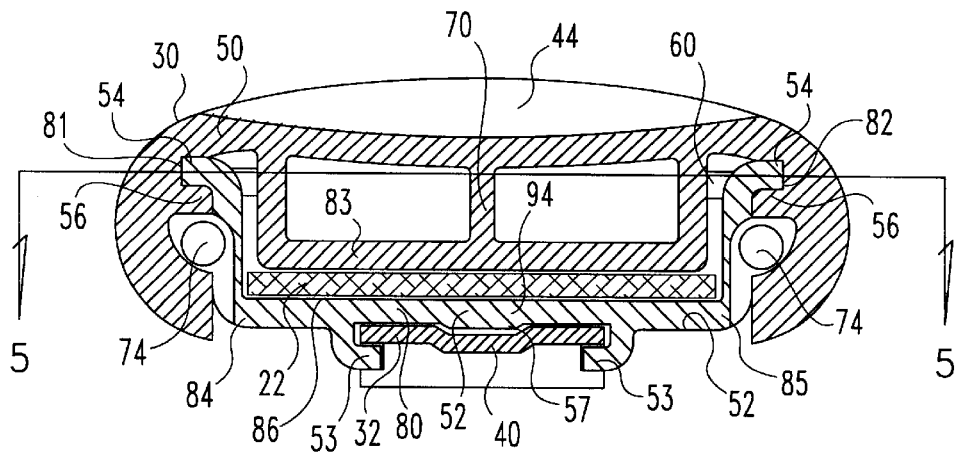
FIG. 4 is a view of the apparatus of FIG. 2 as taken along line 4—4 of FIG. 2.

FIG. 4 is a view of the apparatus of FIG. 2 as taken along line 4—4 of FIG. 2. Clamp 30 comprises a housing 50 and a slider 52. Slider 52 is slidably coupled to and moveable along track 32. Slider 52 includes two pairs of fingers 53 integrally attached to the main body 80 of the slider and having distal ends spaced apart from the main body forming a slot containing track 32. Fingers 53 wrap around the edges of track 32. Housing 50 is slidable relative to slider 52. A pair of lips 54 integrally attached to main body 80 of slider 52 extend outwardly in opposite directions into mutually facing recesses 81 and 82 formed in the opposite edges 56 of housing 50. Wall 83 of housing 50 is spaced apart from wall portions 84 and 85 of slider main body 80 forming a slot 86 through which seatbelt 22 is moveable.

Main body 80 of slider 52 also incorporates a center bump 57. Center bump 57 has a shape that fits with clearance within groove 40 of track 32. However, center bump 57 provides increased resistance to movement of slider 52 along track 32 between support position 42 and endstop 36. Bump 57 provides a slight interference fit between slider 52 and the grooveless portion of track 32. Although the preferred embodiment includes a generally flat track 32 with a groove 40 therein, the present invention also contemplates other methods of guiding clamp 30 along a predetermined path such as, by way of example only, a groove within the structure of the vehicle or one or more rails mounted to the vehicle. In addition, such alternative tracks could incorporate alternative methods of providing increased resistance to movement of clamp 30 at a support position.

Figure 5:
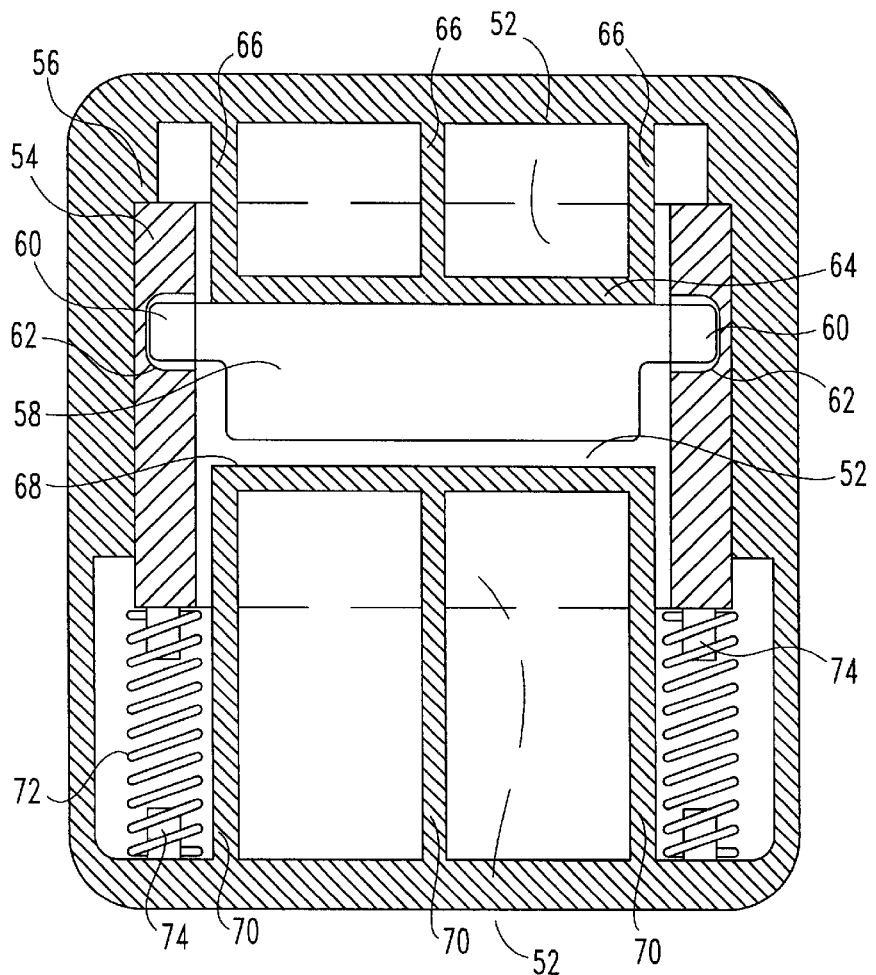
FIG. 5 is a view of the clamp of FIG. 2 as taken along line 5—5 of FIG. 4.

FIG. 5 is a view of the clamp of FIG. 2 as taken along line 5—5 of FIG. 4. Clamp 30 also includes within it a locking bar 58. Locking bar 58 includes a pair of cylindrical pivots 60 that are pivotally mounted within holes 62 within slider 52. Locking bar 58 is shown in FIG. 5 in contact with unlocking rest 64 of housing 50. Internal webs 66 support unlocking rest 64. Generally opposing unlocking rest 64 and located on the other side of locking bar 58 is locking rest 68. Locking rest 68 is supported in housing 50 by internal webs 70. A pair of springs 72 urge housing 50 relative to slider 52 so as to position locking bar 58 in contact with unlocking rest 64. A pair of pins 74 position each spring 72.

Figure 6:
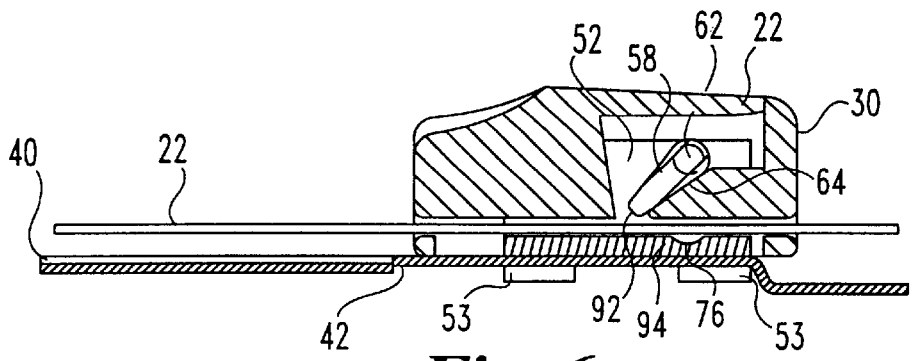
FIG. 6 shows a centered cross section of the clamp and track of FIG. 2 with the slider in contact with the first endstop.
Figure 7:
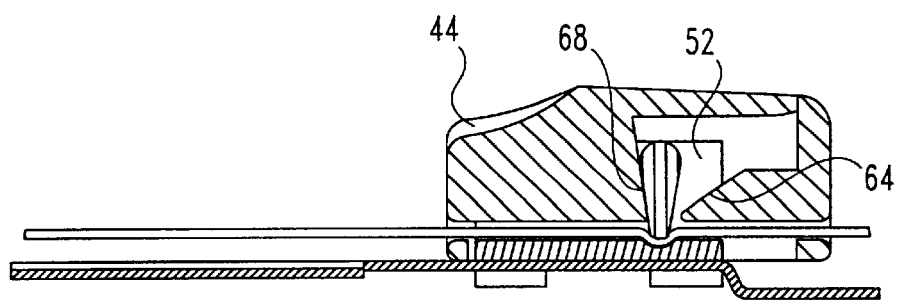
FIG. 7 shows the clamp and track of FIG. 6 with the clamp pushed against the first endstop.
Figure 8:
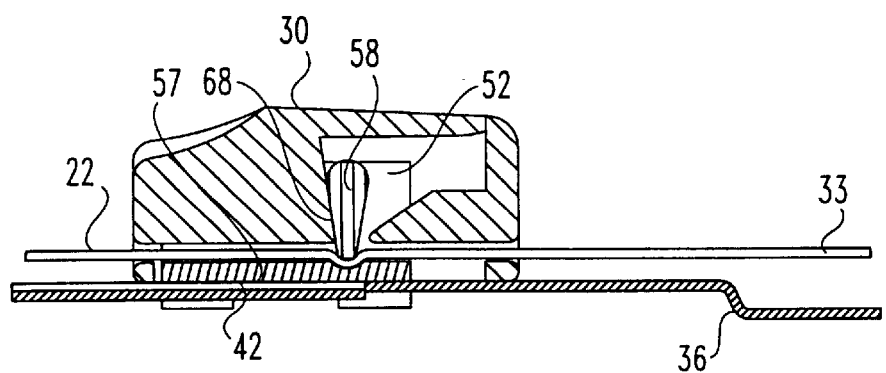
FIG. 8 shows the clamp and track of FIG. 6 with the clamp supported at a support position.

Operation of clamp 30 is shown in FIGS. 6, 7, and 8. The present invention provides an apparatus and methods for providing a predetermined amount of slack in the shoulder portion of a seatbelt securing a passenger to a seat in a vehicle. In order to provide the predetermined amount of slack, the present invention must be knowingly engaged by the passenger. After the passenger has fastened the tongue of seatbelt 22 into a buckle (not shown), the passenger pushes upon depression 44 of housing 50 and slides clamp 30 past support position 42 until slider 52 comes into contact with first endstop 36.

FIG. 6 shows the clamp and track of the present invention with the slider in contact with the first endstop. In FIG. 6, the passenger has moved clamp 30 past support position 42 and placed slider 52 in contact with first endstop 36 but has not fully pushed clamp 30 against first endstop 36. The bias of springs 72 has not been overcome by the passenger and slider 52 and housing 50 remain spaced apart such that locking bar 58 is in the unlocked position against unlocking rest 64. In FIG. 6, seatbelt 22 is free to slide within clamp 30.

FIG. 7 shows the clamp and track of the present invention with the clamp pushed to a locking position against the first endstop. In FIG. 7, the passenger has completed pushing clamp 30 against first endstop 36 with sufficient force to overcome the force of springs 72 and to slide housing 50 into the locked position relative to slider 52. As housing 50 is slid relative to slider 52 locking bar 58 moves out of contact with unlocking rest 64. Continued sliding of housing 50 relative to slider 52 results in locking rest 68 coming into contact with locking bar 58. Locking rest 68 has an angled face in contact with locking bar 58 that places locking bar 58 generally perpendicular to the portion of slider platform 94 opposite of holes 62. The slider platform 94 is integrally attached to and extends between portions 84 and 85 (FIG. 4) of the main body 80 of the slider. In the preferred embodiment there is a locking groove 76 in this portion of slider platform 94. As pressure is applied by the passenger on clamp 30, locking rest 68 places edge 92 of locking bar 58 into locking groove 76 such that belt 22 is clamped between edge 92 and locking groove 76. This action secures clamp 30 to seatbelt 22. Holes 62 for pivoting of locking bar 58 are generally opposite of locking groove 76 of slider platform 94.

As shown in FIG. 7, clamp 30 is secured to seatbelt 22, and as the passenger removes his hand from clamp 30, housing 50 will remain in the locked position relative to slider 52. If the passenger should move forward, for example in reaching something relatively close, the shoulder of the passenger will pull seatbelt 22 with clamp 30 secured to it along track 32 to a maximum location of second endstop 38. When the passenger returns to his normally seated position retractor 28 applies tension to portion 33 (FIG. 1) of belt 22 between retractor 28 and clamp 30. This tension is sufficient to move clamp 30 over that portion of track 32 that includes groove 40, clamp 30 moving freely over groove 40.

However, tension in portion 33 of seatbelt 22 is insufficient to pull clamp 30 past support position 42. As clamp 30 reaches support position 42, tension in portion 33 is insufficient to overcome the increased friction of bump 57 with support position 42. Therefore, clamp 30 remains at support position 42, as shown in FIG. 8, which is spaced apart a short, predetermined distance from first endstop 36. Thus, there is an increase in the length of seatbelt 22 around the passenger by the predetermined amount, and there is increased slack in the shoulder portion 24 of seatbelt 22 which results in shoulder portion 24 being more comfortable to the passenger. The predetermined increase in length of seatbelt 22 is equal to the distance from first endstop 36 to support position 42. Tension in belt portion 33 is reacted by the friction of bump 57 with support position 42. Thus, the present invention eliminates tension from the retractor into shoulder portion 24.

The present invention permits the passenger to freely move within the vehicle within the limit set by second endstop 38. After moving within this limit and then returning to a seated position, the passenger will not experience tension in shoulder portion 24 of seatbelt 22 because of the support of clamp 30 by support position 42. However, clamp 30 will release the securement of belt 22 between edge 92 and groove 76 if the passenger moves sufficiently far. For example, if the passenger reaches to the other side of the vehicle, then seatbelt 22 will pull clamp 30 against second endstop 38. As slider 52 of clamp 30 comes into contact with second endstop 38, the tension in belt 22 from the movement of the passenger will pull edge 92 out of locking groove 76. Springs 72 will urge housing 50 to become spaced apart to the unlocking position relative to slider 52. Locking bar 58 comes into contact with unlocking rest 64. For the vertical orientation of track 32 shown in FIG. 1, the unlocked clamp 30 slides freely over track 32 back to support position 42. Clamp 30 is no longer secured to seatbelt 22 and tension loads from retractor 28 are no longer reacted within track 32, but are instead felt against the shoulder of the passenger. The passenger may reset clamp 30 to the locked position by repeating the steps described above. During emergency operation the present invention does not interfere with the normal operation of seatbelt 22 or retractor 28.

FIGS. 9–19 depict the preferred embodiment of the present invention. In this embodiment, a releaseable clamp supports the tension provided by the retractor of the seatbelt and increases the length of seatbelt around the passenger by a predetermined amount. In one embodiment the invention includes a clamp capable of releaseably clamping to the seatbelt, the clamp being slideably movable along a track between first and second endstops. The clamp includes a button which can be pushed to secure the clamp to the belt when the clamp is at the first endstop. If the passenger then pulls on the belt, as when reaching for a control switch of the vehicle, the clamp and seatbelt move along the track from the first endstop toward the second endstop. If the passenger moves sufficiently, the clamp will be pulled past a support position of the track that is intermediate of the first and second endstops. When the passenger returns to his regular seated position, tension from the retractor pulls the clamp seatbelt back towards the first endstop. However, pushing the button to secure the clamp to the belt also deflects a tab which limits the movement of the clamp and causes the clamp to stop at the support position. Since the support position is above the first endstop, a predetermined amount of slack is provided in the seatbelt. Seatbelt tension from the retractor which would otherwise be felt by the occupant is instead reacted or applied at the support position of the track, and little or no tension is felt by the passenger.

Figure 9:
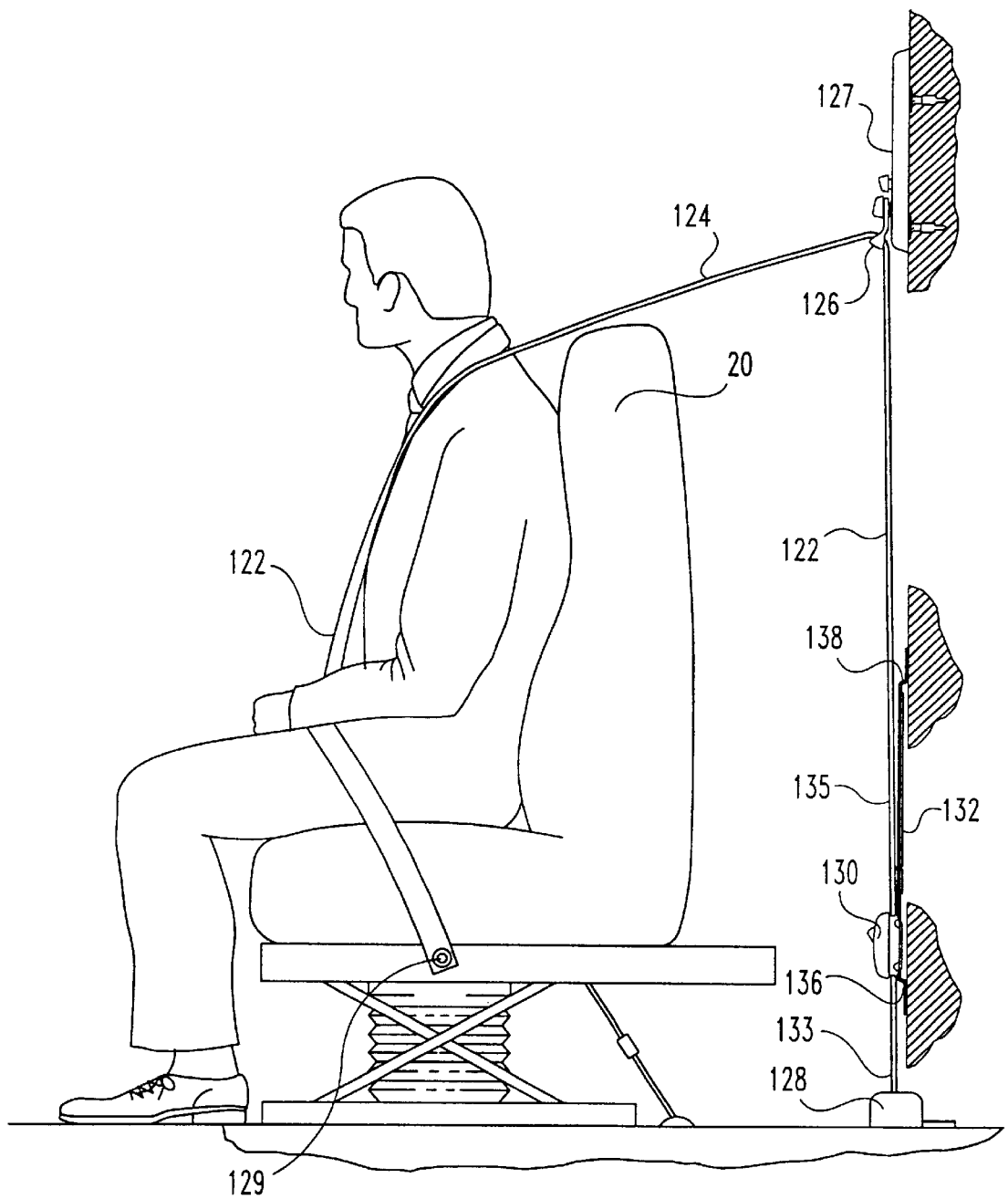
FIG. 9 shows a preferred embodiment of the present invention as used within a vehicle.
Figure 10:
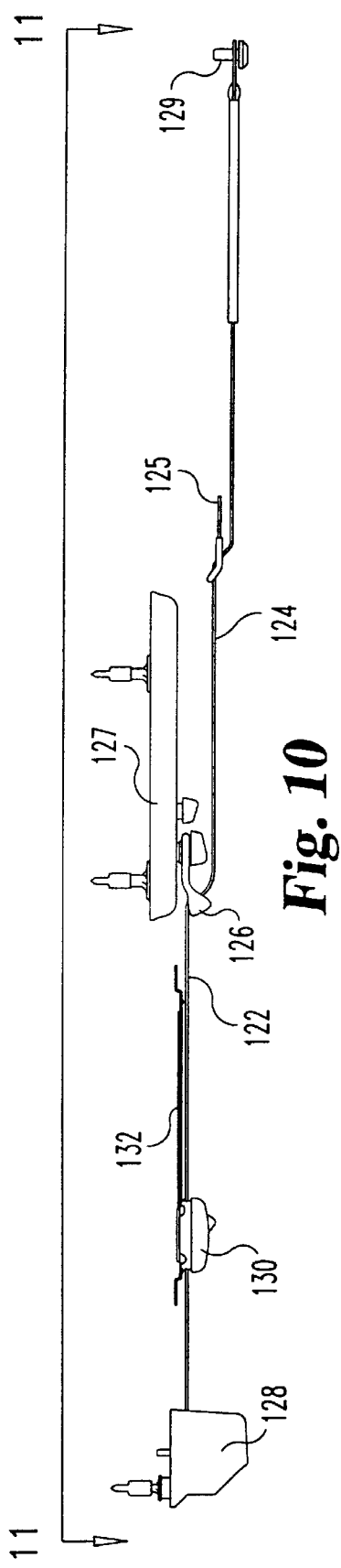
FIG. 10 is a side view of a portion of the apparatus shown in FIG. 9, as removed from the vehicle.
Figure 11:
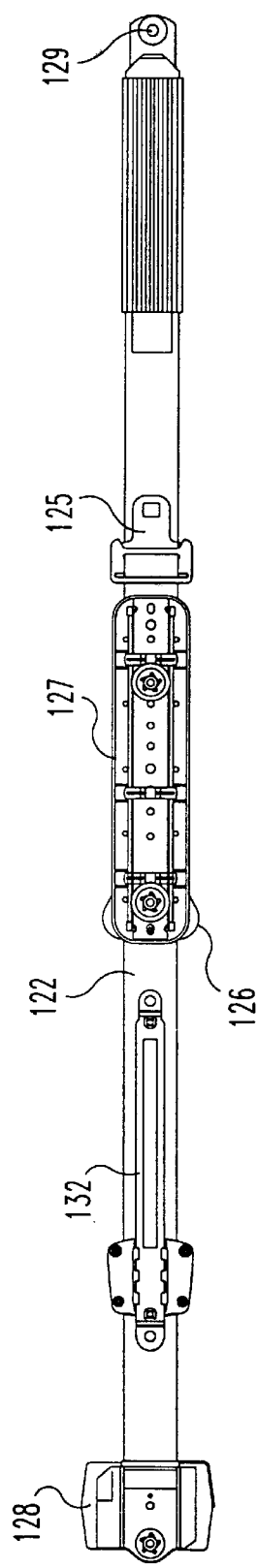
FIG. 11 is a view of the apparatus of FIG. 10 as taken along lines 11—11 of FIG. 10.

FIG. 9 shows one embodiment of the present invention as used within a vehicle. FIGS. 10 and 11 show the seatbelt apparatus of FIG. 9 as removed from the vehicle. A passenger is shown secured to a seat 20 by a three point seatbelt 122. Seatbelt 122 includes a shoulder portion 124 that rides over the shoulder of the passenger and passes through a support 126 which is anchored to the structure of the vehicle. Support 126 permits shoulder portion 124 to pass freely through. One example of support 126 is a D-loop. Some embodiments of the present invention include an adjustable support 127 attached to the vehicle which permits the passenger to slide D-loop 126 along a track. Although one example of support 126 is a D-loop, those of ordinary skill in the art will recognize other types of supports for the shoulder portion of the seatbelt.

Seatbelt 122 is pulled from a retractor 128 anchored to the structure of the vehicle. One end of seatbelt 122 is mounted to a spring-biased spool rotatably mounted within retractor 128, and an opposite end of seatbelt 122 is anchored to the frame of seat 20. A conventional tongue 125 is slideably mounted between the ends of seatbelt 122. Tongue 125 is releaseably lockable in a conventional manner with a buckle (not shown) anchored to the vehicle frame.

When seatbelt 122 is buckled around the passenger, the belt webbing is pulled from retractor 128. Likewise, when the passenger moves from the seated position after buckling, belt webbing is pulled from retractor 128. During a rapid deceleration of the vehicle, retractor 128 locks seatbelt 122 from further webbing extension such that the passenger is held securely in seat 20. Retractor 128 may be of the inertia reel type, an electronically controlled type, or other types known to those skilled in the art. During non-emergency operation, retractor 128 places tension in belt 122 in the direction of retracting seatbelt 122 to within retractor 128.

Figure 12:
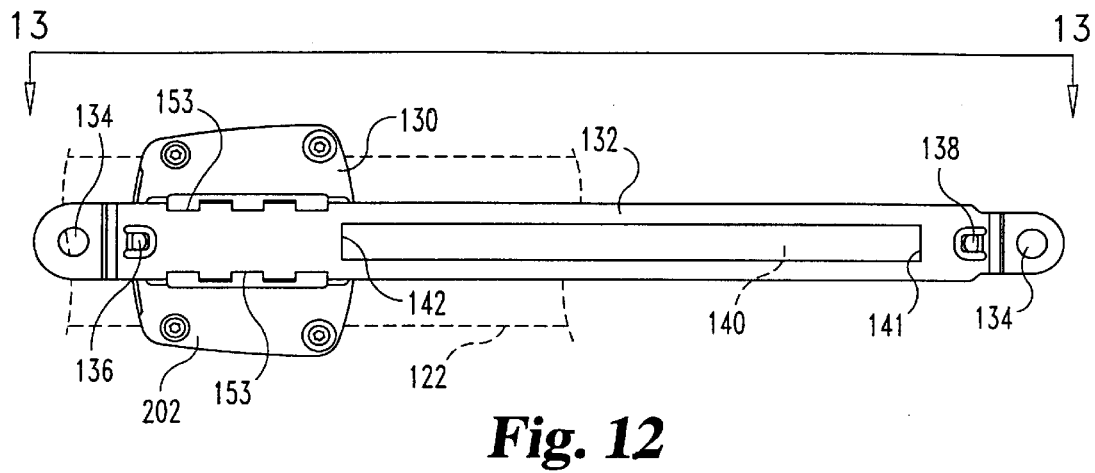
FIG. 12 is an enlarged view of the track, clamp, and seatbelt of FIG. 11.
Figure 13:
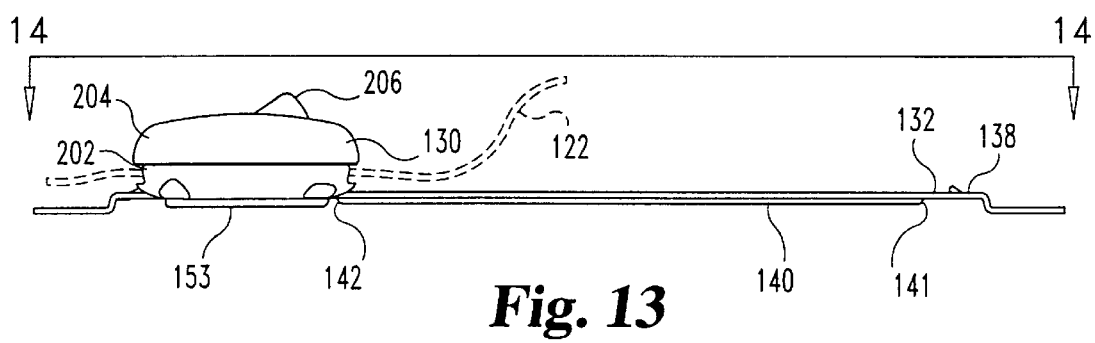
FIG. 13 is a view of the apparatus of FIG. 12 as viewed in the direction of arrows 13—13 of FIG. 12.
Figure 14:
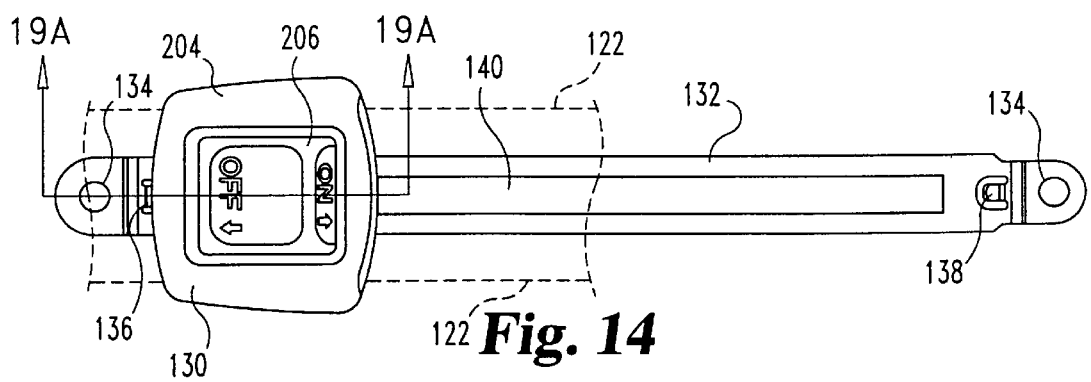
FIG. 14 is a view of the apparatus of FIG. 13 as viewed in the direction of arrows 14—14 of FIG. 13.

FIGS. 12, 13, and 14 show bottom, side, and top orthogonal views, respectively, of the track and clamp of FIGS. 9, 10, and 11. Seatbelt 122 is shown in dotted lines in FIGS. 12, 13, and 14. Located between retractor 128 and support 126 is clamp assembly 130 which is slideably movable along track 132. Clamp 130 includes a housing preferably comprised of a housing bottom half 202 fastened to a housing top half 204, the housing halves including between them a movable button 206. Housing halves 202 and 204 and button 206 are shown assembled in clamp 130 in FIGS. 12, 13, and 14. Clamp 130 is slideably coupled to track 132 by a plurality of fingers 153 which wrap around the edges of track 132, as best seen in FIG. 12. By the slideable coupling of fingers 153 to track 132, clamp 130 is moveable along track 132 between a first endstop 136 and a second endstop 138. Track 132 includes a recess or groove 140 placed lengthwise along a portion of the length of track 132. Groove 140 extends from a first edge or support position 142 to a second edge 141. Between support position 142 and second edge 141 track 132 has the general cross sectional shape of a flattened U, with groove 140 in the middle as the lower portion of the U-shape with the elevated, nonrecessed portions of track 132 on either side of the groove. Groove 140 projects away from button 206 of clamp 130, as can be seen in FIG. 19C.

Those of ordinary skill in the art will recognize the suitability of other configurations for track 132, including as one example, a cut-out groove in place of the recessed groove that has been described. Track 132 is preferably fabricated as a stamped piece of steel, although those of ordinary skill in the art will recognize the suitability of other metals and plastic materials for the track. First and second endstops 136 and 138, respectively, are bent upwards, as best seen in FIG. 13, and limit the sliding movement of clamp 130. A pair of fastener holes 134 in the opposite offset ends of track 132 as best seen in FIGS. 12 and 14 are provided for attachment of track 132 to the vehicle.

Track 132 is secured to a portion of the vehicle in a generally vertical orientation, as best seen in FIG. 9. With this orientation, first endstop 136 is below second endstop 138. This vertical orientation permits clamp 130 to move under the influence of gravity to the first endstop when the clamp is not secured to seatbelt 122. Preferably track 132 is arranged vertically, although those of ordinary skill in the art will recognize that track 132 may be angled from a vertical orientation and still permit an unsecured clamp 130 to fall to the first endstop under the influence of gravity. Although support 126, retractor 128, clamp 130, and track 132 are shown in FIG. 9 behind seat 20 and in front of the rear vehicle compartment wall, they also may be located to a side of seat 20 or along the B-pillar of the vehicle. Also, retractor 128 may be concealed or behind the rear compartment wall with seatbelt 122 extending through a slot in the rear compartment wall to the clamp assembly 130 with track 132 mounted in front of the wall. Also, clamp 130 and track 132 may be mounted adjacent support 126.

Figure 15:
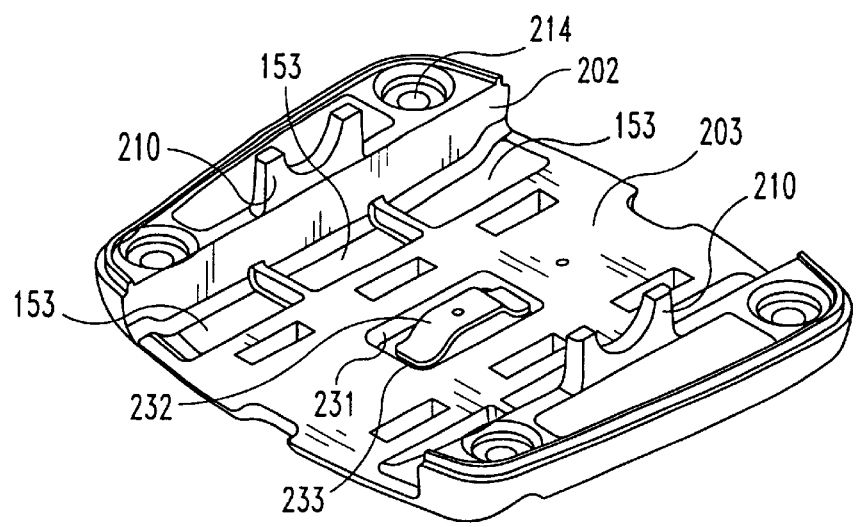
FIG. 15 is a top perspective view of the bottom portion of the clamp of FIG. 13.
Figure 16:
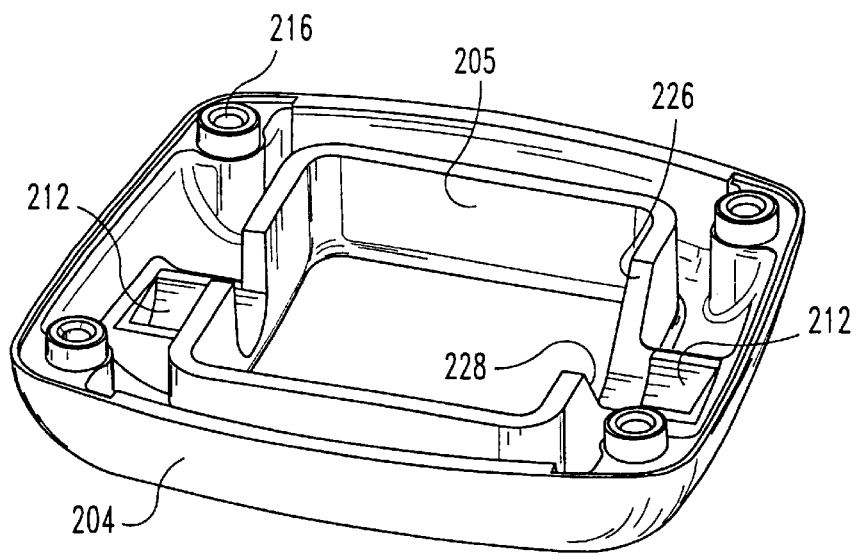
FIG. 16 is a bottom perspective view of the top portion of the clamp of FIG. 13.
Figure 17:
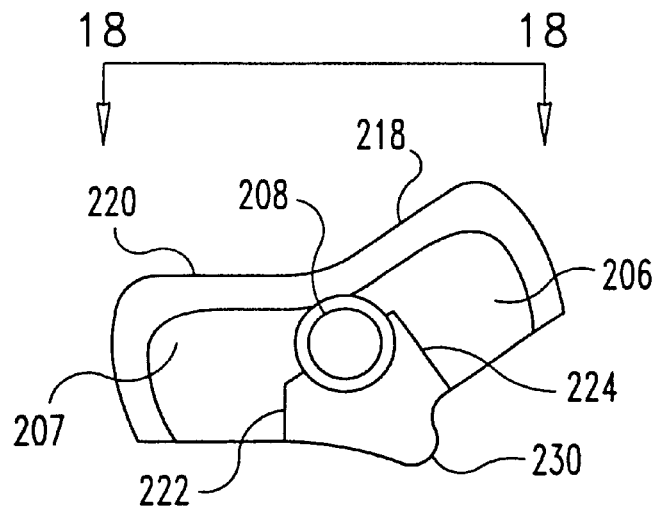
FIG. 17 is a side view of the button of FIG. 13.
Figure 18:
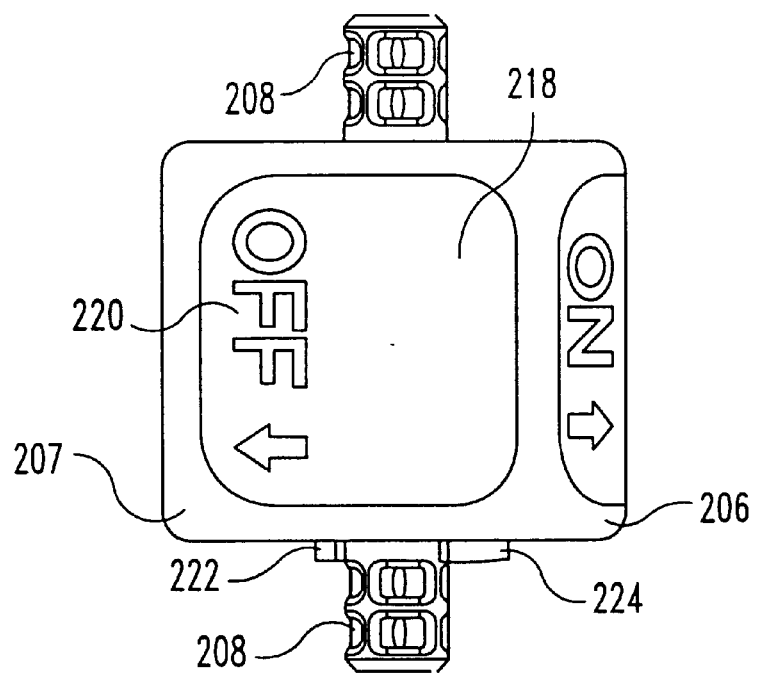
FIG. 18 is a view of the button of FIG. 17 as viewed in the direction of arrows 18—18 of FIG. 17.

FIGS. 15, 16, 17, and 18 depict the disassembled components which comprise clamp 130. FIG. 15 is a perspective view of the interior of housing bottom half 202, and FIG. 16 is a perspective view of the interior of housing top half 204, the housing halves being disassembled from one another so as to show interior details. FIG. 17 is a side view of movable button 206 in the same position as depicted for button 206 in FIG. 13, except removed from housing halves 202 and 204 of clamp 130. FIG. 18 is atop view of button 206.

Referring to FIG. 15, housing bottom half 202 includes a bottom wall 203. Located along the outer surface of bottom wall 203 are a plurality of fingers 153 which slideably couple housing half 202 to track 132, as best seen in FIG. 12. Bottom wall 203 also includes a relief opening 231. Placed within relief opening 231 and cantilevered from bottom wall 203 is a deflectable tab 232. Tab 232 is preferably fabricated from metal such as steel and attached within wall 203 during molding of housing half 202. Alternatively, tab 232 may also be formed from plastic during the molding of housing half 202. The free end of deflectable tab 232 includes an edge 233. By pressing on the middle of tab 232, edge 233 can be made to move toward the exterior of housing half 202. Tab 232 is a repeatedly deflectable portion of housing half 202, and can be pressed and deflected repeatedly to move edge 233 toward the exterior of the housing. Tab 232 returns to the undeflected position when the pressure is removed. Projecting upwardly from bottom wall 203 on either side of housing half 202 are a pair of support posts 210. Each support post 210 includes a cylindrically shaped groove. Housing half 202 also includes a plurality of through holes 214 for fasteners.

Referring to FIG. 16, top housing half 204 includes an interior wall surrounding a central aperture 205, aperture 205 providing clearance to receive the central portion of button 206. Housing half 204 also includes a pair of cylindrical cavities 212 placed on opposite sides of aperture 205. Located at the juncture of the wall defining aperture 205 and one of the cylindrical cavities 212 are stop surfaces 226 and 228 for limiting the pivoting motion of button 206. Housing top half 204 also includes a plurality of portions 216 for threadably receiving the threaded portion of fasteners (not shown).

A pivotal button 206 is shown in FIGS. 17 and 18. Button 206 includes a rectangular central portion 207, and a pair of cylindrical axles 208 extending outwardly from opposing sides of central portion 207. Central portion 207 includes a first pressure surface 218 which is angled relative to a second pressure surface 220. Pressure surfaces 218 and 220 are arranged and constructed to receive pressure applied by the fingers or hand of the passenger. Referring to FIG. 17, application of pressure normal to first surface 218 results in clockwise pivoting of button 206 about axles 208. Application of pressure normal to second surface 220 results in counterclockwise pivoting of button 206 about axles 208. Button 206 also includes a projecting ridge or locking edge 230 which preferably spans the width of central portion 207. Button 206 also includes a pair of stops 222 and 224 to limit pivoting motion of button 206. Clamping stop 222 and unclamping stop 224 both extend from a side of central portion 207 adjacent an axle 208. Clamping stop 222 and unclamping stop 224 coact with stop surfaces 226 and 228, respectively, of housing top half 204.

Clamp 130 is assembled by placing a length of seatbelt 122 on the interior of bottom wall 203 of housing half 202. Button 206 is then placed on housing half 202 such that axles 208 are cradled within the cylindrical grooves of support posts 210, with projecting ridge 230 being adjacent seatbelt 122. Housing top half 204 is inverted from the position shown in FIG. 16, and placed on top of housing half 202 and button 206. Central portion 207 of button 206 protrudes through aperture 205 of housing half 204. The top half of axles 208 of button 206 are located within cylindrical cavities 212 of housing half 204. Clearance space is provided from support post 210 to axles 208, and from cylindrical cavities 212 to axles 208, so that button 206 is freely pivotal when assembled between housing halves 202 and 204. Housing half 202 may be secured to housing half 204 by the use of fasteners (not shown) extending through fastener holes 214 of bottom half 202 and into threaded portion 216 of housing half 204.

When button 206 is pivotally supported by housing halves 202 and 204, pivotal motion of button 206 is limited by the coaction of the button stops with the stop surfaces of housing half 204. For example, application of force to pressure surface 218 causes button 206 to move pivotally to a first position. The pivotal movement of button 206 toward the first position is stopped by the contact of clamping stop 222 of button 206 with stop surface 226 of housing half 204. Application of force to pressure surface 220 causes button 206 to pivot to a second position. Pivotal motion of button 206 toward the second position is stopped by contact of unclamping stop 224 of button 206 with stop surface 228 of housing top half 204. Thus, within limits set by the coaction of stops 222 and 224 with stop surfaces 226 and 228, respectively, button 206 of clamp 130 is pivotable between a first position and a second position.

Figure 19A:
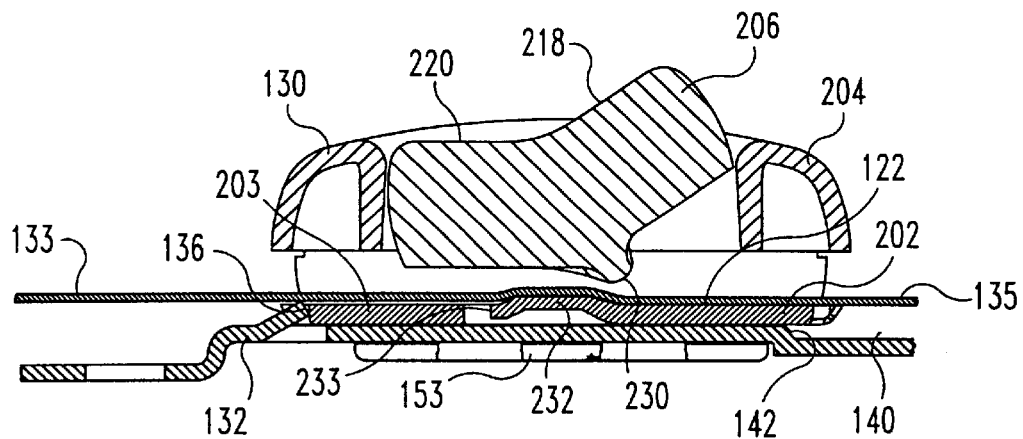
FIG. 19A is a cutaway view of the apparatus of FIG. 14 as taken along lines 19A—19A of FIG. 14.
Figure 19B:
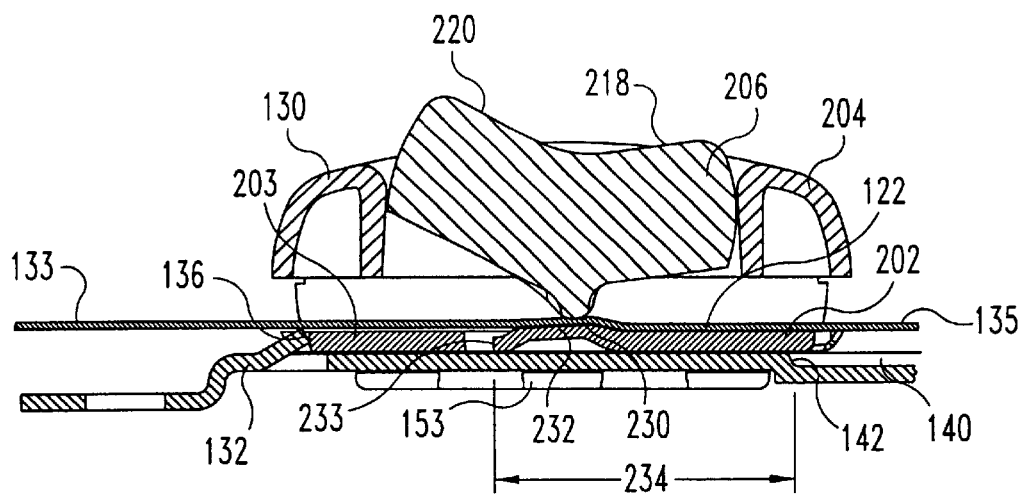
FIG. 19B is the same view of the apparatus of FIG. 19A only with the clamp secured to the seatbelt.
Figure 19C:
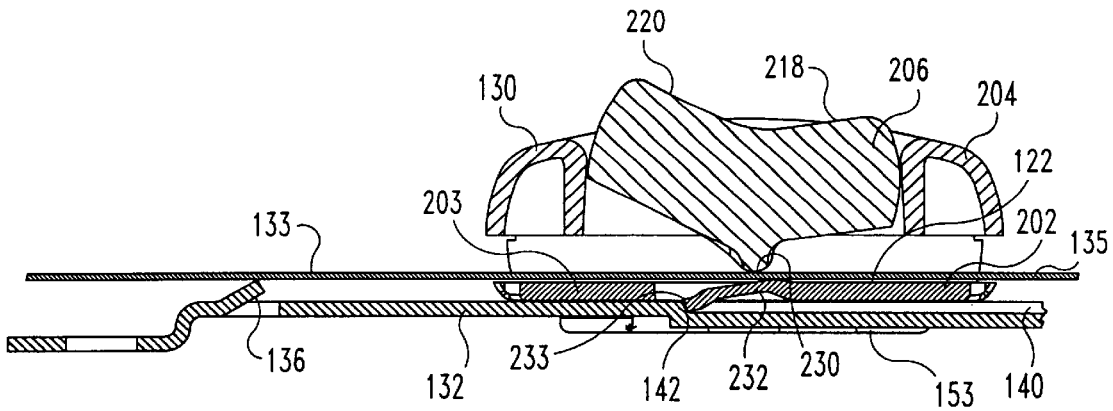
FIG. 19C is the same view of the apparatus of FIG. 19B only with the clamp moved to the support position.

FIGS. 19A, 19B, 19C, and 19D are cross sectional views of the clamp, tract, and belt during operation. FIG. 19A is a cross sectional view of the apparatus of FIG. 14 as taken along lines 19A—19A of FIG. 14. FIG. 19A depicts button 206 of clamp 130 in a second position in which clamp 130 is not secured to seatbelt 122. Because of clearance between button projection 230 and seatbelt 122, seatbelt 122 is free to slide within clamp 130 between button 206 and wall 203. Preferably, track 132 is arranged vertically as seen in FIG. 9. Because of this vertical orientation, clamp 130 slides along track 132 under the influence of gravity until it contacts first endstop 136. In a preferred embodiment, retractor 128 continuously pulls on portion 133 of seatbelt 122 and, for the unclamped seatbelt 122 shown in FIG. 19A, thereby places belt portion 133, the portion between retractor 128 and deflectable tab 232, in tension. Since clamp 130 is not locked to seatbelt 122 in FIG. 19A, portion 135 of seatbelt 122, the portion between deflectable tab 232 and shoulder portion 124, is also in tension. Thus, retractor 128 is free to pull seatbelt 122 through clamp 130 except as limited by the passenger, and the passenger is free to move seatbelt 122 through clamp 130 except as limited by the retractor. After the passenger is secured to seat 20 by locking tongue 125 in the buckle, tension applied by the retractor in seatbelt portion 133 is felt on the shoulder of the passenger since that tension is communicated to seatbelt portions 135 and 124 (see FIG. 9).

Referring now to FIG. 19B, clamp 130 is releaseably secured to seatbelt 122 when the passenger applies pressure to surface 218 of button 206 and pushes button 206 to the first position. As previously described, pivoting movement of clamp 206 is limited by contact of clamping stop 222 of button 206 with stop surface 226 of housing top half 204. Pivoting of button 206 to the first position places ridge 230 in contact with seatbelt 122, and subsequently pushes and deflects tab 232, including edge 233, into contact with track 132. Seatbelt 122 is secured to clamp 130 between wall 203 and ridge 230 when button 206 is placed in the second position. Tension force applied by the passenger through seatbelt portion 135 in excess of the tension force applied by retractor 128 pulls additional length of seatbelt 122 from the retractor and also pulls seatbelt 122 and clamp 130 upward along track 132. The tension force applied by the passenger must also exceed the friction force at the contact interface between edge 233 of deflected tab 232 and track 132.

As the passenger continues to apply sufficient tension to move clamp 130 along track 132, such as when the passenger moves forward to adjust a control of the vehicle, edge 233 of deflectable tab 232 moves axially past support position or edge 142 and into groove 140, as best seen in FIG. 19C. Once edge 233 of tab 232 has dropped into groove 140, clamp 130 is now more easily pulled along the grooved portion of track 132, there being little or no friction between the bottom of tab 232 and groove 140. When the passenger returns to the normal seated position, tension applied by retractor 128 within seatbelt portion 133 pulls clamp 130 and seatbelt 122 downwardly until edge 233 of tab 232 is in abutting relationship with edge 142 of groove 140. The abutting relationship of edge 142 and edge 233 limits the retraction of seatbelt 122 into retractor 128. Tension applied in portion 133 of seatbelt 122 is reacted against, or applied against, support position or edge 142 of track 132 by edge 233 of tab 232, this tension pulling clamp 130 toward support position 142. Portion 135 of seatbelt 122 on the passenger side of ridge 230 of button 206 is essentially free of tension from retractor 128. The travel of edge 233 from the position shown in FIG. 19B to the position shown in FIG. 19C increases the slack in shoulder portion 124 of seatbelt 122 by a predetermined amount, thus relieving some or all of the tugging pressure otherwise felt at the passenger's shoulder. FIG. 19B shows the increased slack as predetermined amount 234 of seatbelt 122.

Figure 19D:
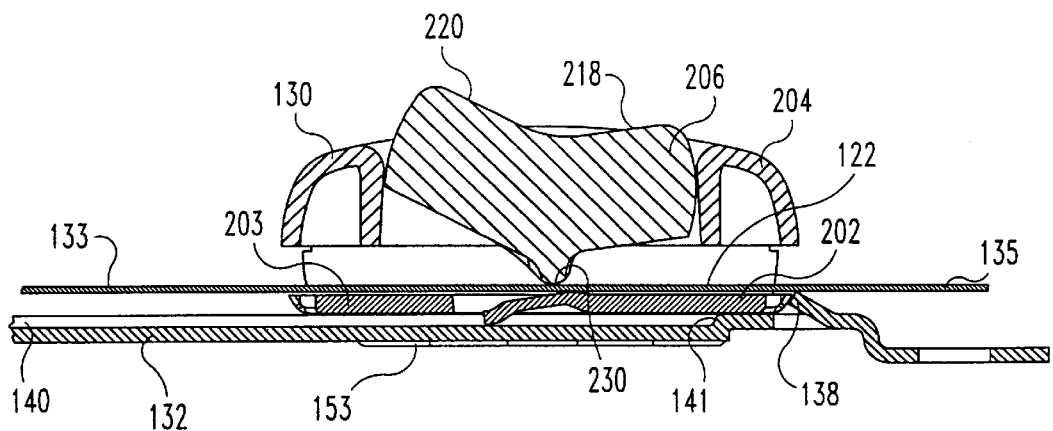
FIG. 19D is the same view of the apparatus of FIG. 19C only with the clamp moved to the second endstop of the track.

Referring to FIG. 19D, if the passenger moves a sufficiently large distance from the normal seated position, clamp 130, as secured to seatbelt 122, will move along track 132 as far as second endstop 138. The engagement of second endstop 138 with bottom housing half 202 limits upward sliding movement of clamp 130. Continued application of tension or pulling by the passenger upon portion 135 of seatbelt 122 releases seatbelt 122 from clamp 130. This release occurs because a portion of the tension force applied by the passenger becomes a sliding force acting on projecting ridge 230 of button 206. This sliding force acting on ridge 230 creates a counterclockwise moment on button 206. Further pulling on seatbelt 122 increases the moment on button 206 to where button 206 rotates in the counterclockwise direction to the second, or unclamped, position. Clamp 130 is then released from seatbelt 122, and falls under the influence of gravity to the position shown in FIG. 19A. Also, clamp 130 may be unlocked from seatbelt 122 by the application of pressure to surface 220 of button 206, thus pivoting button 206 in a counter clockwise direction and removing ridge 230 from contact with seatbelt 122. Pivoting movement of button 206 to the second position is limited by contact of clamping stop 224 of button 206 with stop surface 228 of housing top half 204. With button 206 pushed to the second position, there is sufficient clearance between ridge 230 and tab 232 for clamp 130 to move freely relative to seatbelt 122.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A restraint system for a passenger in a vehicle, comprising:

a passenger seat;

a seatbelt for securing a passenger within said seat;

a retractor for retracting said seatbelt and capable of holding said seatbelt during deceleration of the vehicle;

a track having a portion with a groove, the groove having a first edge; and a clamp movable on said track, said clamp including a movable button with a first position and a second position, said clamp including a deflectable tab having a second edge, said clamp capable of releaseably clamping said seatbelt;

wherein moving said button to the first position secures said clamp to said seatbelt and deflects said tab, said clamp being movable along said track to a support position where the second edge of said tab is in abutting relationship to the first edge of said groove.

2. The system of claim 1 wherein said clamp is movable along the grooved portion of said track when said button is in the first position.

3. The system of claim 1 wherein said track is oriented generally vertically, said track has a first endstop below a second endstop, and said clamp moves under gravity to the first endstop when said button is in the second position.

4. The system of claim 1 wherein said button is pivotable between the first position and the second position.

5. The system of claim 4 wherein said button includes a ridge, said clamp includes a lower wall, and pivoting said button to the first position secures said seatbelt between the ridge and the lower wall.

6. The system of claim 1 wherein said track has a first endstop and a second endstop, and pulling said seatbelt when said clamp is at the second endstop releases said seatbelt from said clamp.

7. The system of claim 1 wherein moving said button to the second position releases said seatbelt from said clamp.

8. The system of claim 1 wherein the abutting relationship of the second edge and the first edge limits the retraction of said seatbelt into said retractor.

9. The system of claim 8 wherein said button is pivotable between said first position and said second position, said button includes a ridge, said clamp includes a lower wall, and pivoting said button to the first position secures said seatbelt between the ridge and the lower wall.

10. The system of claim 9 wherein moving said button to the second position releases said seatbelt from said clamp.

11. A passenger restraint system for a vehicle, comprising:

a passenger seat;

a seatbelt for securing a passenger within said seat;

a retractor for retracting said seatbelt and capable of holding said seatbelt during deceleration of the vehicle;

a track with first and second endstops; and a clamp movable on said track between the first endstop and the second endstop, said clamp including a button movable between a first position and a second position, said clamp capable of releaseably clamping said seatbelt;

wherein moving said button to the first position secures said clamp to said seatbelt, and moving said button to the second position releases said seatbelt from said clamp.

12. The system of claim 11 wherein said clamp includes a housing with a wall, said housing pivotally supports said button, and pivoting said button to the first position secures said seatbelt between said button and the wall.

13. The system of claim 12 wherein pivoting said button to the second position permits said seatbelt to pass freely between said button and the wall.

14. The system of claim 11 wherein said clamp includes a repeatably deflectable portion, said button is pivotally movable within said clamp, said track includes a support position, and pivoting said button to the first position deflects the portion of said clamp so as to restrict movement of said clamp past the support position.

15. The system of claim 11 wherein pulling said seatbelt when said clamp is at the second endstop releases said seatbelt from said clamp.

16. The system of claim 11 wherein said clamp and said track are arranged and constructed such that gravity moves said clamp to the first endstop when said button is in the second position.

17. The system of claim 11 wherein said retractor applies a tension force in said seatbelt, said track includes a support position between the first endstop and the second endstop, and said track is arranged and constructed such that tension from said retractor pulls said clamp toward the support position when said button is in the first position.

18. The system of claim 17 wherein the tension force applied by said retractor is applied against the support position of said track when said button is in the first position.

19. The system of claim 18 wherein said clamp includes a housing with a wall, said housing pivotally supports said button, and pivoting said button to the first position secures said seatbelt between said button and the wall, and pivoting said button to the second position permits said seatbelt to pass freely between said button and the wall.

20. The system of claim 19 wherein said clamp includes a repeatably deflectable portion and pivoting said button to the first position deflects the portion of said clamp so the deflected portion restricts movement of said clamp past the support position.

21. A method for releaseably clamping a seatbelt, comprising:

providing a retractor, a clamp with a pushable button, a seatbelt, and a track, said track having a first stop, a second stop, and a support position, the clamp being slideable along the track between the stops;

applying tension in the seatbelt by the retractor;

locking the seatbelt to the clamp by pushing the button;

moving the clamp and seatbelt to a support position along the track; and supporting the clamp and seatbelt such that the tension in the seatbelt from the retractor is applied at the support position.

22. The method of claim 21 which further comprises unlocking the seatbelt from the clamp by pushing the button.

23. The method of claim 21 which further comprises permitting the seatbelt to freely slide to one of the stops by unlocking the seatbelt from the clamp.

24. The method of claim 21 wherein said supporting is by deflecting a portion of the clamp and abutting the deflected portion with a portion of the track.

25. The method of claim 24 which further comprises unlocking the seatbelt from the clamp by pushing the button.

26. The method of claim 24 wherein said moving increases the slack in the seatbelt by a predetermined amount.

27. A restraint system for a passenger in a vehicle, comprising:

a passenger seat;

a seatbelt for securing a passenger within said seat;

a retractor for retracting said seatbelt and capable of holding said seatbelt during deceleration of the vehicle;

a track having a portion with a groove, the groove having a first edge; and a clamp movable on said track, said clamp including a deflectable tab with a first position and a second position with said deflectable tab having a second edge, said clamp capable of releasably clamping said seatbelt;

wherein moving said deflectable tab to said first position allows said clamp to secure said seatbelt, said clamp being movable along said track to a support position where the second edge of said deflectable tab is moved toward the first edge of said groove.

28. The system of claim 27 wherein said clamp includes a moveable member with a ridge, said member being moveable between first and second positions, and moving said member to the first position and moving said deflectable tab to the first position secures said seatbelt between the ridge and said deflectable tab.

29. The system of claim 28 wherein said retractor applies a tension force in said seatbelt, said track includes a first endstop and a second endstop, the first edge of the groove being intermediate of the first endstop and the second endstop, and said track is arranged and constructed such that tension from said retractor pulls said clamp toward the support position when said deflectable tab is in the first position.

30. The system of claim 27 wherein said retractor applies a tension force in said seatbelt, said track includes a first endstop and a second endstop, the first edge of the groove being intermediate of the first endstop and the second endstop, and said track is arranged and constructed such that tension from said retractor pulls said clamp toward the support position when said deflectable tab is in the first position.

31. The system of claim 27 wherein said clamp and said track are arranged and constructed such that gravity moves said clamp to the first endstop when said deflectable tab is in the second position.

* * * * *